(12) United States Patent
Shinohara et al.

(10) Patent No.: US 8,581,460 B2
(45) Date of Patent: Nov. 12, 2013

(54) ARMATURE FOR ROTATING ELECTRICAL MACHINE

(75) Inventors: Keiichi Shinohara, Okazaki (JP); Takuma Takabayashi, Hamamatsu (JP)

(73) Assignee: Aisin AW Co., Ltd., Anjo (JP)

( * ) Notice: Subject to any disclaimer, the term of this patent is extended or adjusted under 35 U.S.C. 154(b) by 296 days.

(21) Appl. No.: 13/028,643

(22) Filed: Feb. 16, 2011

(65) Prior Publication Data

US 2011/0198953 A1 Aug. 18, 2011

(30) Foreign Application Priority Data

Feb. 18, 2010 (JP) ................................. 2010-033943

(51) Int. Cl.
*H02K 3/28* (2006.01)
*H02K 11/00* (2006.01)

(52) U.S. Cl.
USPC .............................. 310/71; 310/207; 310/260

(58) Field of Classification Search
CPC ...................................................... H02K 3/12
USPC .................................... 310/71, 201, 207, 260
IPC .............. H02K 3/28, 11/00, 3/04, 17/00, 19/00, H02K 21/00, 23/26, 27/02
See application file for complete search history.

(56) References Cited

U.S. PATENT DOCUMENTS

| | | | | |
|---|---|---|---|---|
| 6,049,154 | A * | 4/2000 | Asao et al. ..................... | 310/201 |
| 6,204,586 | B1 * | 3/2001 | Umeda et al. ................. | 310/179 |
| 6,441,527 | B1 * | 8/2002 | Taji et al. ...................... | 310/201 |
| 6,624,544 | B2 * | 9/2003 | Higashino et al. ............ | 310/201 |
| 6,770,999 | B2 * | 8/2004 | Sakurai ......................... | 310/208 |
| 6,862,796 | B2 * | 3/2005 | Kato .............................. | 29/596 |
| 6,956,314 | B2 * | 10/2005 | Higashino et al. ............ | 310/207 |
| 7,343,662 | B2 * | 3/2008 | Gorohata et al. .............. | 29/596 |
| 7,923,884 | B2 * | 4/2011 | Seguchi et al. ............... | 310/201 |
| 2002/0033649 | A1 * | 3/2002 | Oohashi et al. ............... | 310/184 |

(Continued)

FOREIGN PATENT DOCUMENTS

| JP | A-3-196738 | 8/1991 |
|---|---|---|
| JP | A-2000-166150 | 6/2000 |

(Continued)

OTHER PUBLICATIONS

Apr. 5, 2011 International Search Report issued in PCT/JP2011/050052 (with translation).
Mar. 8, 2011 International Search Report issued in International Patent Application No. PCT/JP2011/051903 (with translation).

*Primary Examiner* — John K Kim
(74) *Attorney, Agent, or Firm* — Oliff & Berridge, PLC (57) ABSTRACT

An armature for a rotating electrical machine, including an armature core and a coil wound around the armature core. The segment conductor includes a joint extension portion that extends in the axial direction relative to the armature core from at least one end portion of a conductor edge portion. The coil has an n-layer winding structure and includes an inter-layer joint portion on an axial direction outer side of the armature core. The inter-layer joint portion joining a first and second layer side joint extension portions. At least one of the first and second layer side joint extension portions forming a pair to be joined by the inter-layer joint portion includes an offset bend portion, and the first layer side joint extension portion and the second layer side joint extension portion are joined such that respective joint surfaces thereof oppose each other in a circumferential direction.

6 Claims, 4 Drawing Sheets

(56) References Cited

U.S. PATENT DOCUMENTS

| | | | |
|---|---|---|---|
| 2002/0079771 A1* | 6/2002 | Taji et al. | 310/179 |
| 2005/0110360 A1* | 5/2005 | Neet et al. | 310/208 |
| 2006/0006757 A1* | 1/2006 | Seguchi | 310/184 |
| 2006/0066167 A1* | 3/2006 | Saito et al. | 310/201 |
| 2009/0200888 A1 | 8/2009 | Tanaka et al. | |
| 2011/0001373 A1* | 1/2011 | Mori et al. | 310/71 |
| 2011/0012450 A1* | 1/2011 | Umeda et al. | 310/71 |
| 2011/0198953 A1* | 8/2011 | Shinohara et al. | 310/71 |

FOREIGN PATENT DOCUMENTS

| | | |
|---|---|---|
| JP | A-2002-78269 | 3/2002 |
| JP | A-2002-209355 | 7/2002 |
| JP | A-2004-096995 | 3/2004 |
| JP | A-2004-135438 | 4/2004 |
| JP | A-2007-037344 | 2/2007 |
| JP | A-2009-011064 | 1/2009 |
| JP | A-2009-219343 | 9/2009 |

* cited by examiner

FIG. 7B

ARMATURE FOR ROTATING ELECTRICAL MACHINE

INCORPORATION BY REFERENCE

The disclosure of Japanese Patent Application No. 2010-033943 filed on Feb. 18, 2010 including the specification, drawings and abstract is incorporated herein by reference in its entirety.

BACKGROUND OF THE INVENTION

The present invention relates to an armature for a rotating electrical machine, including an armature core formed by disposing in a distributed fashion a plurality of slots extending in an axial direction of a cylindrical core reference surface in a circumferential direction of the core reference surface, and a coil formed by joining a plurality of segment conductors and wound around the armature core.

DESCRIPTION OF THE RELATED ART

In a conventional technique to improve a space factor of a coil in an armature for a rotating electrical machine, the coil is formed by disposing conductor edge portions of a plurality of segment conductors molded into a U shape regularly in slots of an armature core, and joining together joint extension portions of different segment conductors extending in an axial direction relative to the armature core (see Japanese Patent Publication No. 3196738 (FIG. 7 etc.), for example). In a constitution having this type of coil, as shown in FIG. 7 of Japanese Patent Publication No. 3196738, joint portions formed by joining together the joint extension portions of the segment conductors are disposed in a large number on an axial direction outer side of the armature core. It is therefore difficult with this constitution to secure an electrical insulating property between adjacent joint portions. With regard to this point, Japanese Patent Application Publication No. JP-A-2000-166150 discloses a technique for securing distance between adjacent joint portions by setting a ratio of the lengths of a pair of joint extension portions joined together by a joint portion at a value other than 1 and making the value of this ratio different between adjacent joint portions in a radial direction so that adjacent joint portions do not overlap when seen from a radial direction first side. Further, Japanese Patent Application Publication No. JP-A-2002-78269 discloses a technique for securing distance between adjacent joint portions by disposing a segment conductor inserted from an axial direction first side of the armature core and a segment conductor inserted from an axial direction second side of the armature core alternately such that the joint portions of the segment conductors are dispersed to both axial direction sides of the armature core.

SUMMARY OF THE INVENTION

However, with the constitution described in Japanese Patent Application Publication No. JP-A-2000-166150, the ratio of the lengths of the pair of joint extension portions joined together by the joint portion must be set at a value other than 1 and the value of this ratio must be made different between adjacent joint portions in the radial direction. Therefore, during manufacture of the armature for a rotating electrical machine, orientations and types of the segment conductors must be managed strictly, which may lead to an increase in manufacturing cost. Further, with the constitution described in Japanese Patent Application Publication No. JP-A-2002-78269, the joint portions of the segment conductors are dispersed to both axial direction sides of the armature core, and therefore an axial direction size of the armature for a rotating electrical machine and manufacturing complexity may increase.

It is therefore desirable to realize an armature for a rotating electrical machine with which an increase in manufacturing cost and a size increase in an axial direction can be suppressed.

In an armature for a rotating electrical machine according to a first aspect of the present invention, which includes an armature core fowled by disposing in a distributed fashion a plurality of slots extending in an axial direction of a cylindrical core reference surface in a circumferential direction of the core reference surface, and a coil formed by joining a plurality of segment conductors and wound around the armature core, the segment conductor includes a conductor edge portion disposed along the axial direction within the slot and a joint extension portion that extends in the axial direction relative to the armature core from at least one end portion of the conductor edge portion, the coil has an n-layer winding structure in which n (where n is an integer of two or more) of the conductor edge portions are arranged in a radial direction within each slot, and includes an inter-layer joint portion on an axial direction outer side of the armature core, the inter-layer joint portion being formed by joining together a first layer side joint extension portion and a second layer side joint extension portion, which are joint extension portions extending from conductor edge portions that are disposed respectively in different slots so as to form adjacent layers to each other, and at least one of the first layer side joint extension portion and the second layer side joint extension portion forming a pair to be joined by the inter-layer joint portion includes an offset bend portion for offsetting the corresponding joint extension portion in the radial direction toward a side approaching the other joint extension portion of the pair, and the first layer side joint extension portion and the second layer side joint extension portion are joined such that respective joint surfaces thereof oppose each other in a circumferential direction.

According to this featured constitution, at least one of the first layer side joint extension portion and the second layer side joint extension portion forming the pair to be joined by the inter-layer joint portion includes the offset bend portion for offsetting the corresponding joint extension portion in the radial direction toward the side approaching the other joint extension portion of the pair, and therefore a width in the radial direction occupied by the inter-layer joint portion can be suppressed below a total width in the radial direction occupied by the first layer side joint extension portion and second layer side joint extension portion on the conductor edge portion side of the offset bend portion. Hence, in a case where a plurality of the inter-layer joint portions are arranged in the radial direction, distance can be secured appropriately between adjacent inter-layer joint portions in the radial direction. As a result, an electrical insulating property can be secured between the inter-layer joint portions easily, thereby facilitating an improvement in the overall electrical insulating property of the coil.

Further, according to the featured constitution described above, a ratio of the lengths of the pair of joint extension portions joined by the joint portion does not necessarily have to take different values between adjacent joint portions in the radial direction, and the ratio of the lengths of the pair of joint extension portions to be joined may be set at substantially one in relation to two adjacent joint portions in the radial direction, for example. Hence, strictness in management of the orientation and type of the segment conductors required for manufacture of the armature for a rotating electrical machine can be reduced, and as a result, an increase in manufacturing cost can be suppressed.

Furthermore, distance can be secured appropriately between adjacent inter-layer joint portions in the radial direction even when a plurality of the inter-layer joint portions are arranged in the radial direction, and therefore the inter-layer joint portions serving as the joint portions of the segment conductors do not necessarily have to be dispersed to both axial direction sides of the armature core. Hence, a constitution in which the joint portions of the segment conductors are disposed on only one axial direction side of the armature core can be provided easily, and as a result, an increase in the axial direction size of the armature for a rotating electrical machine and an increase in manufacturing complexity can be suppressed.

Here, according to a second aspect, the conductor edge portion from which the first layer side joint extension portion extends may be positioned on a circumferential direction first side relative to the conductor edge portion from which the second layer side joint extension portion extends, the joint surface of the second layer side joint extension portion may face the circumferential direction first side, and the joint surface of the first layer side joint extension portion may face a circumferential direction second side.

According to this constitution, the first layer side joint extension portion and the second layer side joint extension portion forming the pair to be joined by the inter-layer joint portion can be disposed so as not to intersect when seen from a radial direction first side. As a result, when the armature for a rotating electrical machine for the rotating electrical machine is manufactured by inserting the segment conductors molded into bend in advance, the manufacturing process can be simplified by reducing the limitation about the insertion order of the segment conductors. Further, when the rotating electrical machine is manufactured by bending the segment conductors which are in a state inserted in the slots, the manufacturing process can be simplified by reducing the limitation about the processing order of the segment conductors.

Furthermore, according to a third aspect, the first layer side joint extension portion and the second layer side joint extension portion forming the pair to be joined by the inter-layer joint portion may be disposed so as to intersect when seen from a radial direction first side, the conductor edge portion from which the first layer side joint extension portion extends may be positioned on a circumferential direction first side relative to the conductor edge portion from which the second layer side joint extension portion extends, the joint surface of the first layer side joint extension portion may face the circumferential direction first side, and the joint surface of the second layer side joint extension portion may face a circumferential direction second side.

According to this constitution, the parts provided with the respective joint surfaces of the first layer side joint extension portion and the second layer side joint extension portion forming the pair to be joined can be positioned by being hooked to each other. As a result, the joint surfaces can be positioned easily even when an error occurs in the shapes of the two joint extension portions, and the precision of the formation position of the inter-layer joint portion can be improved. Further, the joint surfaces of the two joint extension portions are joined together while in contact with each other, making the joining operation easy, and with this constitution, the reliability of the joint formed by the inter-layer joint portion can be improved.

Furthermore, according to a fourth aspect, a plurality of radial direction arrangement portions may be formed by arranging in the radial direction a plurality of the inter-layer joint portions sharing both the slot in which the conductor edge portion from which the first layer side joint extension portion to be joined extends is disposed and the slot in which the conductor edge portion from which the second layer side joint extension portion to be joined extends is disposed, and in each of the plurality of inter-layer joint portions constituting each one of the radial direction arrangement portions, the first layer side joint extension portion and the second layer side joint extension portion to be joined may have an identical positional relationship in the radial direction, and the offset bend portions provided on the joint extension portions to be joined may have an identical form.

According to this constitution, an appropriate distance can be secured between adjacent inter-layer joint portions in the radial direction with respect to all of the inter-layer joint portions constituting the radial direction arrangement portion, As a result, the electrical insulating property between the inter-layer joint portions can be secured even more reliably.

DETAILED DESCRIPTION OF THE EMBODIMENTS

Figure 1:
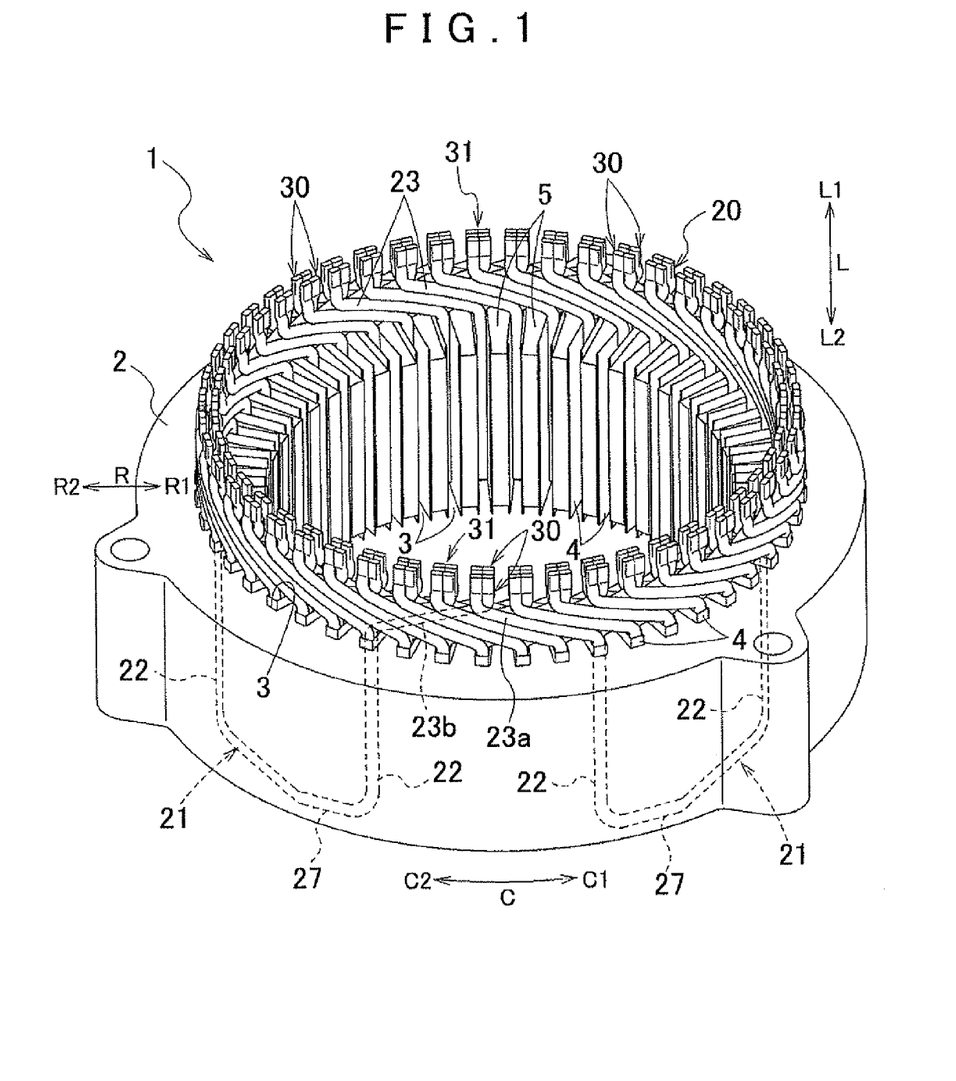
FIG. 1 is a perspective view of a stator according to an embodiment of the present invention.

Embodiments of an armature for a rotating electrical machine according to the present invention will be described below with reference to the drawings. Here, a case in which the present invention is applied to a stator for an inner rotor type rotating electrical machine will be described as an example. As shown in FIG. 1 and so on, a feature of a stator 1 according to this embodiment is that in an inter-layer joint portion 30, which is a joint portion between tip end portions of segment conductors 21 constituting a coil 20, tip end portions of a pair of joint extension portions 23 to be joined are disposed adjacent to each other in a circumferential direction C. In so doing, an appropriate distance can be secured between inter-layer joint portions 30 that are adjacent to each other in a radial direction R, and as a result, an electrical insulating property between the inter-layer joint portions 30 can be improved. The constitution of the stator 1 according to this embodiment will be described in detail below.

Unless indicated otherwise, in this description an "axial direction L", the "circumferential direction C", and the "radial direction R" are defined using an axial center of a cylindrical core reference surface to be described below as a reference. Further, in the following description, an "axial direction first side L1" represents an upper side of the axial direction L in FIG. 1, while an "axial direction second side L2" represents a lower side of the axial direction L in FIG. 1. Furthermore, in the following description, as shown in FIG. 1, a "circumferential direction first side C1" represents a counter-clockwise direction side when the stator 1 (a stator core 2) is seen from the axial direction first side L1, while a "circumferential direction second side C2" represents a clockwise direction side when the stator 1 (the stator core 2) is seen from the axial direction first side L1. Note that in the following description, directions relating to the coil 20 and the segment conductors 21 constituting the coil 20 denote directions in a state where the coil 20 and the segment conductors 21 are attached to the stator core 2.

Further, in this embodiment, the stator 1 and the stator core 2 correspond respectively to an "armature for a rotating electrical machine" and an "armature core" according to the present invention.

1. Overall Constitution of Stator

The overall constitution of the stator 1 according to this embodiment will now be described with reference to FIG. 1. As shown in FIG. 1, the stator 1 includes the stator core 2 and the coil 20, and is constituted by an armature for a rotating electrical machine. Note that in this specification, the term "rotating electrical machine" is used as a concept including any of a motor (electric motor), a generator (electric generator), and a motor/generator that exhibits the functions of both a motor and a generator as required.

The stator core 2 is formed from a magnetic material and formed by disposing a plurality of slots 3 (48 in this example) extending in the axial direction L of the cylindrical core reference surface in a distributed fashion in the circumferential direction C of the core reference surface, whereupon the coil 20 can be wound around the stator core 2. Here, the "cylindrical core reference surface" is an imaginary surface that serves as a reference with regard to the arrangement and constitution of the slots 3. In this embodiment, as shown in FIG. 1, a core inner peripheral surface, which is an imaginary cylindrical surface including end surfaces on a radial direction inner side R1 of teeth 5 positioned between adjacent slots 3 in the circumferential direction C, may be defined, and this cylindrical core inner peripheral surface may be set as the "cylindrical core reference surface" according to the present invention. Further, a cylindrical surface (including an imaginary surface) which is concentric with the cylindrical core inner peripheral surface and has a sectional shape when seen in the axial direction L that is analogous with the sectional shape of the core inner peripheral surface when seen in the axial direction L may be considered as the "cylindrical core reference surface" according to the present invention. For example, in this embodiment, as shown in FIG. 1, the stator core 2 is formed in a cylindrical shape, and therefore an outer peripheral surface of the stator core 2, excluding an attachment projecting portion, may be set as the "cylindrical core reference surface".

The stator core 2 includes a plurality of the slots 3 disposed in a distributed fashion in the circumferential direction C on the cylindrical core inner peripheral surface. The plurality of slots 3 are disposed at predetermined circumferential direction intervals and provided to extend in the axial direction L. The slots 3 are formed to have an identical sectional shape (which is rectangular in this example) on an orthogonal plane to the axial direction L.

In this embodiment, the stator 1 is used in a rotating electrical machine driven by a three-phase alternating current (a U phase, a V phase, and a W phase). Therefore, U phase, V phase and W phase slots 3 are disposed in the stator core 2 so as to appear repeatedly in the circumferential direction C. In this example, two adjacent U phase slots 3, two adjacent V phase slots 3, and two adjacent W phase slots 3 are formed repeatedly in the circumferential direction C of the stator core 2 in the order listed herein such that a number of slots for each pole and each phase is "2". The coil 20 also has a three phase constitution (a U phase, V phase, and a W phase), and as will be described in detail below, the coil 20 is wound around the stator core 2 by wave winding. In this embodiment, the coils of the respective phases provided in the coil 20 are constituted similarly. Therefore, in the following description, the coils of the respective phases will not be described separately unless necessary.

Although not shown in the drawings, a rotor serving as a field and including a permanent magnet or an electromagnet is disposed on the radial direction inner side R1 of the stator 1 (the stator core 2) to be capable of rotating relative to the stator 1. The rotor is rotated by a rotating magnetic field generated from the stator 1. In other words, the stator 1 according to this embodiment is a stator for an inner rotor, rotating magnetic field type rotating electrical machine.

Note that the stator core 2 described above may be a stacked structure formed by stacking a plurality of annular plate-shaped magnetic steel sheets, or may be formed using as a principle constitutional element a compacted powder material obtained by press-molding a powder type magnetic material, for example. Further, in this embodiment, the plurality of slots 3 are formed in the stator core 2 so that the number of slots for each pole and each phase is "2", but the number of slots for each pole and each phase may of course be modified appropriately. For example, the number of slots for each pole and each phase may be set at "1" or "3". Furthermore, the number of phases of an alternating current power supply used to drive the rotating electrical machine may be modified appropriately to "1", "2", or "4", for example.

2. Constitution of Coil

Next, the constitution of the coil 20 according to this embodiment will be described in detail. The coil 20 is formed by joining together a plurality of the U-shaped segment conductors 21 in sequence, and has an n-layer winding structure in which n conductor edge portions 22, to be described below, are arranged in each slot 3 in the radial direction R. Here, n is an integer of 2 or more (for example, an integer of no less than 2 and no more than 10 or the like; an even number of 2 or more is particularly preferable), which is set in accordance with a required torque of the rotating electrical machine, a magnitude of an allowable counter electro-motive force, and so on. In this embodiment, the coil 20 has a ten-layer winding structure in which ten conductor edge portions 22 are arranged in a single row in each slot 3 so as to build up in the radial direction R. In this specification, layer numbers from 1 to n have been assigned to positions of the conductor edge portions 22 in the slots 3 from a radial direction outer side R2 toward the radial direction inner side R1. Note that for simplicity, FIG. 1 shows only the segment conductors 21 whose conductor edge portions 22 are disposed on the four layers (a first layer to a fourth layer) on the radial direction outer side R2. Further, an inter-turn joint portion, a joint portion for forming a neutral point, a connection portion with a terminal for establishing a connection with a power supply, and irregularly shaped segment conductors, bend portions, and so on for forming these components have been omitted from FIG. 1 for simplicity.

As shown in FIG. 1, the segment conductor 21 is constituted by a linear conductor having a rectangular sectional shape on an orthogonal plane to an extension direction (equivalent to an energizing direction). Copper, aluminum, or similar, for example, may be used as a constitutional material of the linear conductor. Further, a surface of the linear conductor, excluding electrical connection locations between different members (a location in which the inter-layer joint portion 30, to be described below, is formed and so on), is covered with an insulating film made of resin or the like (polyimide, for example). Note that the process of forming a coil using a plurality of U-shaped segment conductors is itself well known (see the aforementioned Patent Documents 1 to 3, for example). Therefore, the following description will focus on the main parts of the present invention, namely the inter-layer joint portion 30 and constitutions related thereto, and when specific description is not provided, it is to be assumed that a conventional technique has been applied appropriately.

Figure 2A:
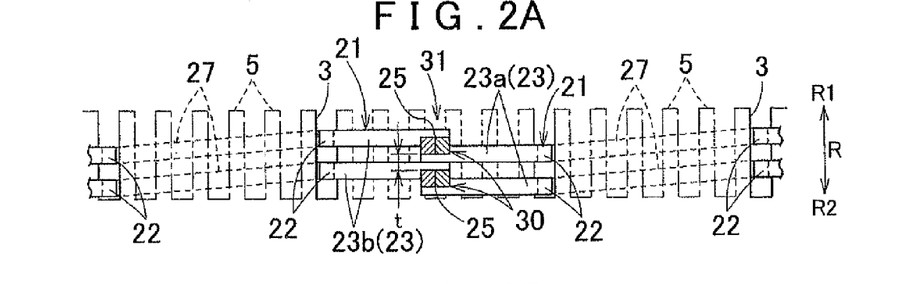
FIGS. 2A and 2B are pattern diagrams each showing a coil arrangement according to an embodiment of the present invention.
Figure 2B:
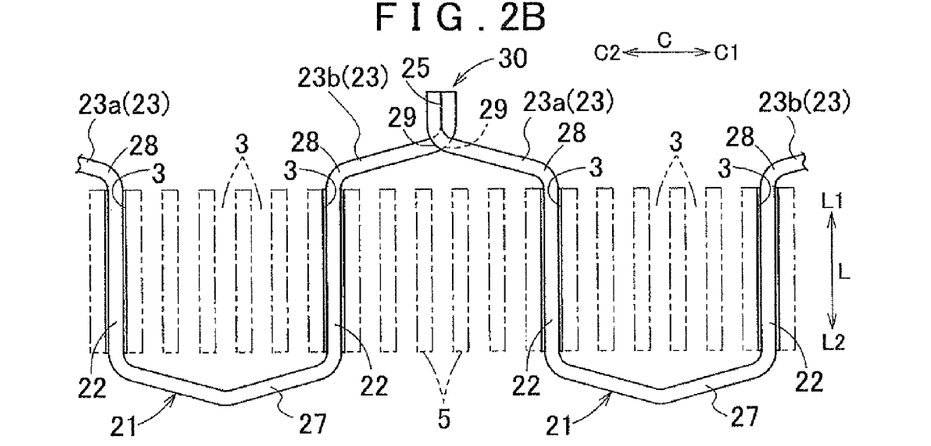

FIGS. 2A and 2B are pattern diagrams each illustrating an arrangement of the coil 20 (the segment conductors 21) according to this embodiment. More specifically, FIG. 2A is a view of two segment conductors 21 indicated by broken lines in FIG. 1, expanded in the circumferential direction C (in planar form) and seen from the axial direction first side L1, while FIG. 2B shows the expanded view of FIG. 2A from the radial direction outer side R2. Note that in FIGS. 2A and 2B, an aspect ratio of the respective members and magnitude relationships between different members have been varied from FIG. 1 in order to clarify the concept of the present invention.

As shown in FIGS. 2A and 2B, the segment conductor 21 includes a pair of conductor edge portions 22 disposed along the axial direction L in a pair of slots 3 having different circumferential direction C positions, an inherent transition portion 27 that connects one end of each of the pair of conductor edge portions 22 on an axial direction outer side of the stator core 2, and a pair of joint extension portions 23 (23a, 23b) that extend respectively from the other end of the pair of conductor edge portions 22 to the axial direction outer side of the stator core 2. Note that the segment conductor 21 is formed from a single continuous conductor, and therefore the inherent transition portion 27 is a continuous transition portion that connects the ends of the pair of conductor edge portions 22 continuously. As shown in FIG. 1, the conductor edge portions 22 are disposed in the slots 3 such that a shorter edge portion on an orthogonal cross-section to an extension direction of the linear conductor extends in the radial direction R. Further, an insulating sheet 4 is inserted into the interior of the slot 3 such that a part thereof projects from an axial direction end portion of the stator core 2, as shown in FIG. 1, whereby an electrical insulating property is secured between the coil 20 and the stator core 2.

Here, the respective segment conductors 21 have different widths in the circumferential direction C (different intervals are provided between the pair of conductor edge portions 22) according to their arrangement positions in the radial direction R relative to the stator core 2, but have a basically identical shape. Therefore, although not shown in FIGS. 2A and 2B, the joint extension portion 23 on the circumferential direction second side C2 of the segment conductor 21 on the circumferential direction second side C2 in FIGS. 2A and 2B is constituted similarly to the joint extension portion 23 on the circumferential direction second side C2 of the segment conductor 21 on the circumferential direction first side C1 in FIGS. 2A and 2B.

As shown in FIG. 1, in a state where the segment conductors 21 have been attached to the stator core 2, the inherent transition portions 27 are positioned on the axial direction second side L2 of the stator core 2 and the joint extension portions 23 are positioned on the axial direction first side L1 of the stator core 2. In the example shown in FIGS. 1 and 2A, 2B, the inherent transition portion 27 takes a V shape, but the shape of the inherent transition portion 27 may be set as desired.

As shown in FIGS. 2A and 2B, each of the pair of joint extension portions 23 provided on the segment conductor 21 is formed with a first bend portion 28 and a second bend portion 29. The first bend portion 28 is provided to bend the pair of joint extension portions 23 provided on the segment conductor 21 in a direction heading away from each other in the circumferential direction C. The second bend portion 29 is provided to bend the pair of joint extension portions 23 bent at the first bend portion 28 in a direction approaching each other in the circumferential direction C until extension directions of tip end side parts (parts in which joint surfaces 25, to be described below, are formed) of the pair of joint extension portions 23 are parallel to each other. In this example, the second bend portion 29 is formed such that the extension directions of the tip end side parts of the joint extension portions 23 become parallel to the axial direction L. As shown in FIGS. 2A and 2B, by forming the first bend portion 28 and second bend portion 29 in this manner, each of the pair of joint extension portions 23 takes a crank shape having a gentle bending angle when seen from the radial direction outer side R2, and a part extending in the circumferential direction C is provided between the first bend portion 28 and the second bend portion 29. Here, the concept expressed as "extending in the circumferential direction" does not always mean extending so as to follow the circumferential direction C and may include an extension direction having a circumferential direction C component. Accordingly, the shape of the "part extending in the circumferential direction C" when seen from either side of the axial direction L may be an arc shape following the circumferential direction C or a straight line shape linking a start point (the position of the first bend portion 28 in the circumferential direction C) and an end point (the position of the second bend portion 29 in the circumferential direction C) in the circumferential direction C, for example.

Note that the segment conductor 21 may be attached to the stator core 2 from the axial direction second side L2 or from the radial direction inner side R1, for example. Further, the first bend portion 28 and the second bend portion 29 may be formed after the segment conductor 21 has been attached to the stator core 2.

As described above, two adjacent U phase slots 3, two adjacent V phase slots 3, and two adjacent W phase slots 3 are formed in the stator core 2 so as to appear repeatedly in the circumferential direction C in the order listed herein. In this embodiment, in accordance with this arrangement of the slots 3, the pair of conductor edge portions 22 provided on the segment conductor 21 are disposed respectively in a pair of slots 3 separated from each other in the circumferential direction C by a distance corresponding to six times an arrangement pitch of the slots 3, as shown in FIGS. 2A and 2B. In other words, the pair of conductor edge portions 22 provided in each segment conductor 21 are disposed respectively in a pair of slots 3 that are separated from each other in the circumferential direction C by a distance corresponding to one magnetic pole pitch (an electrical angle it).

Furthermore, as shown in FIG. 2A, the pair of conductor edge portions 22 provided in the segment conductor 21 are disposed respectively in a pair of slots 3 separated from each other in the circumferential direction C so as to be on adjacent layers. More specifically, with regard to the pair of conductor edge portions 22 provided on the segment conductor 21, the conductor edge portion 22 on the circumferential direction first side C1 is disposed at a single layer offset to the radial direction inner side R1 from the conductor edge portion 22 on the circumferential direction second side C2, By displacing the positions in the radial direction R of the pair of conductor edge portions 22 provided on the segment conductor 21 in this manner, the inherent transition portion 27 can be disposed regularly on the axial direction second side L2 of the stator core 2. Note that a coil end portion shape (the arrangement of the inherent transition portion 27) on the axial direction second side L2 of the stator core 2 has been omitted from FIG. 1, but may be set as desired.

A plurality of segment conductors 21 (four in this example) constituting a single turn are disposed in a distributed fashion in the circumferential direction. In this example, the four segment conductors 21 constituting a single turn are disposed at circumferential direction C intervals corresponding to two magnetic pole pitches (twice the magnetic pole pitch). Note that FIGS. 2A and 2B show only two of the four segment conductors 21. As shown in FIGS. 2A and 2B, by joining the tip end portions of the joint extension portions 23 of adjacent segment conductors 21 to each other in sequence so as to complete a circuit of the circumferential direction C, a wave wound coil portion for a single turn (a single circuit) is formed with an overall cylindrical shape.

Although not shown in FIGS. 2A and 2B, it is evident from FIG. 1 that wave wound coil portions obtained by shifting the wave wound coil portion shown in FIGS. 2A and 2B to either side of the circumferential direction C successively by a multiple m (m=1, 2, ..., 11) of the arrangement pitch of the slots 3 are also provided in the stator core 2. A coil of one phase is formed from a group of wave wound coil portions disposed in shared slots 3 and offset from each other in the circumferential direction C by a distance corresponding to one magnetic pole pitch and a group of wave wound coil portions offset from the aforesaid group of wave wound coil portions by a single slot in the circumferential direction C. In other words, in this embodiment, the coil 20 is wound around the stator core 2 by distributed winding. Note that the wave wound coil portions constituting a coil of a single phase are connected either in series or in parallel.

In this embodiment, to ensure that two adjacent slots 3 are of the same phase, wave wound coil portions of four turns (four circuits) are formed from the segment conductors 21 disposed on two adjacent layers (the first layer and the second layer, for example) and in two adjacent slots 3, and therefore wave wound coil portions for twelve turns are formed in accordance with the three phases. As described above, in FIG. 1, only the coils 20 of the four layers (the first layer to the fourth layer) on the radial direction outer side R2 are shown. Hence, in FIG. 1, wave wound coil portions of eight turns are shown for each phase, and wave wound coil portions for twenty-four turns are shown as a total of the three phases. Although not shown in the drawings, the remaining layers are reduced in overall diameter when seen from the axial direction first side L1 in accordance with the positions in the radial direction R, but have a basically identical shape, and therefore coils 20 corresponding to ten layers may be inserted such that wave wound coil portions are formed for a total of twenty turns (twenty circuits) per phase.

As shown in FIGS. 1 and 2A, 2B, the tip end portion of the joint extension portion 23 on the circumferential direction first side C1 of the segment conductor 21 positioned on the circumferential direction second side C2 is joined to the tip end portion of the joint extension portion 23 on the circumferential direction second side C2 of the segment conductor 21 positioned on the circumferential direction first side C1 Therefore, as is evident from FIG. 2A, the conductor edge portions 22 from which the pair of joint extension portions 23 to be joined respectively extend are disposed on adjacent layers in two slots 3 that are separated from each other in the circumferential direction C by a distance corresponding to one magnetic pole pitch. Hence, in this example, the conductor edge portions 22 from which the two joint extension portions 23 to be joined extend are disposed on adjacent layers, and therefore a joint portion between the tip end portions of the two joint extension portions 23 will be referred to in the present application as an "inter-layer joint portion". Note that the tip end portions of the joint extension portions 23 may be joined by arc welding such as TIG welding, electron beam welding, laser beam welding, resistance welding, brazing, or soldering, for example.

As shown in FIG. 1, the inter-layer joint portion 30 is disposed on the axial direction L outer side (in this example, the outer side of the axial direction first side L1) of the stator core 2. In other words, in the coil 20, the inter-layer joint portion 30 formed by joining together the pair of joint extension portions 23 (a first layer side joint extension portion 23a and a second layer side joint extension portion 23b, to be described below) extending from the conductor edge portions 22 disposed in different slots 3 so as to be on adjacent layers is provided on the axial direction L outer side of the stator core 2. Note that the plurality of inter-layer joint portions 30 are all formed in the positions identical in the axial direction L.

In the following description, with regard to the pair of joint extension portions 23 joined by the inter-layer joint portion 30, a joint extension portion that extends from the conductor edge portion 22 positioned on the circumferential direction first side C1 relative to the conductor edge portion 22 from which the partner joint extension portion 23 extends will be referred to as the first layer side joint extension portion 23a, and a joint extension portion that extends from the conductor edge portion 22 positioned on the circumferential direction second side C2 relative to the conductor edge portion 22 from which the partner joint extension portion 23 extends will be referred to as the second layer side joint extension portion 23b. In other words, the conductor edge portion 22 from which the first layer side joint extension portion 23a extends is positioned on the circumferential direction first side C1 of the conductor edge portion 22 from which the second layer side joint extension portion 23b extends. Accordingly, the first layer side joint extension portion 23a extends from the conductor edge portion 22 to the axial direction first side L1 and then extends to the circumferential direction second side C2 toward the inter-layer joint portion 30, whereas the second layer side joint extension portion 23b extends from the conductor edge portion 22 to the axial direction first side L1 and then extends to the circumferential direction first side C1 toward the inter-layer joint portion 30. Note that when there is no specific need in the following description to differentiate between the first layer side joint extension portion 23a and the second layer side joint extension portion 23b, or when it is evident that either the first layer side joint extension portion 23a or the second layer side joint extension portion 23b is under discussion, the term "joint extension portion 23" will be used.

In this embodiment, as shown in FIGS. 2A and 2B, the second bend portion 29 of the first layer side joint extension portion 23a and the second bend portion 29 of the second layer side joint extension portion 23b are formed in overlapping positions when seen from the radial direction first side such that the tip end portion (the part formed with the joint surface 25 to be described below) of the first layer side joint extension portion 23a is positioned on the circumferential direction second side C2 of the tip end portion (the part formed with the joint surface 25 to be described below) of the second layer side joint extension portion 23b. In other words, in this embodiment, the first layer side joint extension portion 23a and second layer side joint extension portion 23b forming the pair to be joined by the inter-layer joint portion 30 are disposed so as to intersect when seen from the radial direction first side.

Figure 3A:
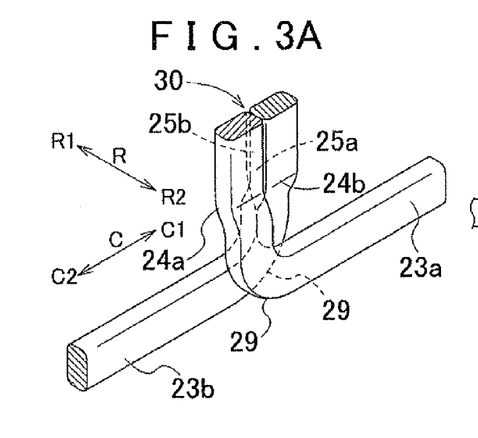
FIGS. 3A and 3B are enlarged pattern diagrams each showing the vicinity of an inter-layer joint portion of the coil, according to an embodiment of the present invention.
Figure 3B:
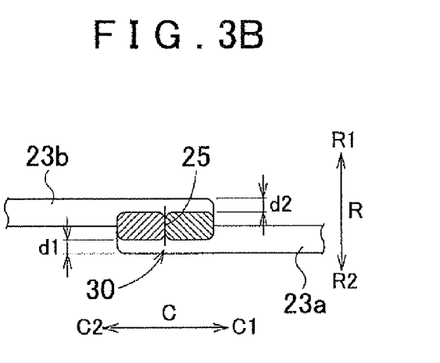

In the inter-layer joint portion 30, the first layer side joint extension portion 23a and second layer side joint extension portion 23b are joined such that the respective joint surfaces 25 thereof oppose each other in the circumferential direction C. More specifically, as shown in FIGS. 3A and 3B, the first layer side joint extension portion 23a includes a first layer side joint surface 25a, which is the joint surface 25 facing the circumferential direction first side C1, and the second layer side joint extension portion 23b includes a second layer side joint surface 25b, which is the joint surface 25 facing the circumferential direction second side C2, whereby the first layer side joint surface 25a and the second layer side joint surface 25b are joined so as to oppose each other in the circumferential direction C. Hereafter, when there is no specific need to differentiate between the first layer side joint surface 25a and the second layer side joint surface 25b, or when it is evident that either the first layer side joint surface 25a or the second layer side joint surface 25b is under discussion, the term "joint surface 25" will be used. Note that FIG. 3A is an enlarged perspective view of the vicinity of the inter-layer joint portion 30 and FIG. 313 is a view showing the vicinity of the inter-layer joint portion 30 from the axial direction first side L1. In these drawings, a bending angle of the second bend portion 29 is shown to be a right angle for the sake of simplicity, but as shown in FIGS. 1 and 2A, 2B, the actual bending angle is larger than a right angle. Further, in FIGS. 3A and 3B, the circumferential direction C is indicated by a straight line in order to facilitate understanding of the invention.

By forming the joint surface 25 of the first layer side joint extension portion 23a and the joint surface 25 of the second layer side joint extension portion 23b, which are joined at the inter-layer joint portion 30, in the manner described above, the parts provided with the respective joint surfaces 25 of the first layer side joint extension portion 23a and the second layer side joint extension portion 23b forming the pair to be joined can be positioned by being hooked to each other. As a result, the joint surfaces 25 can be positioned easily even when an error occurs in the shape of the two joint extension portions 23, and the precision of the formation position of the inter-layer joint portion 30 can be improved. Further, the constitution in which the joint surfaces 25 of the two joint extension portions 23 are joined together while in contact with each other is easily achieved, and with this constitution, the reliability of the joint formed by the inter-layer joint portion 30 can be improved.

As described above, the conductor edge portion 22 from which the first layer side joint extension portion 23a extends and the conductor edge portion 22 from which the second layer side joint extension portion 23b extends are disposed on adjacent layers in slots 3 having different positions in the circumferential direction C. Hence, in this embodiment, the tip end portion of the first layer side joint extension portion 23a and the tip end portion of the second layer side joint extension portion 23b can be arranged in the circumferential direction C at the inter-layer joint portion 30 by providing an offset bend portion 24 to be described below. The constitution of the offset bend portion 24 will be described in detail below.

As shown in FIGS. 3A and 3B, the offset bend portion 24 according to this embodiment is formed on both the first layer side joint extension portion 23a and the second layer side joint extension portion 23b joined by the inter-layer joint portion 30. The offset bend portion 24 is a bend portion for offsetting the corresponding joint extension portion 23 in the radial direction R toward a side approaching the other joint extension portion 23 of the pair. In this example, the offset bend portion 24 is formed further toward the inter-layer joint portion 30 side than the second bend portion 29. In the following description, the offset bend portion 24 provided on the first layer side joint extension portion 23a will be referred to as a first layer side offset bend portion 24a and the offset bend portion 24 provided on the second layer side joint extension portion 23b will be referred to as a second layer side offset bend portion 24b. Note that when there is no specific need to differentiate between the first layer side offset bend portion 24a and the second layer side offset bend portion 24b, or when it is evident that either the first layer side offset bend portion 24a or the second layer side offset bend portion 24b is under discussion, the term "offset bend portion 24" will be used.

As shown in FIGS. 3A and 3B, the first layer side offset bend portion 24a is a bend portion for offsetting a part on the inter-layer joint portion 30 side of the first layer side offset bend portion 24a (in other words, the part formed with the first layer side joint surface 25a) to the radial direction inner side R1 of the part on the conductor edge portion 22 side of the first layer side offset bend portion 24a. In other words, the first layer side offset bend portion 24a is a bend portion for offsetting a center line position of the part on the inter-layer joint portion 30 side of the first layer side offset bend portion 24a to the radial direction inner side R1 relative to a center line position on the conductor edge portion 22 side of the first layer side offset bend portion 24a. Here, a "center line" is a line formed by joining center points on orthogonal cross-sections to an extension direction of the linear conductor forming the segment conductor 21 continuously in an extension direction thereof. In this example, the first layer side offset bend portion 24a is formed in a crank shape having a gentle bending angle when seen from either side of the circumferential direction C, and a first layer side offset width d1, which is an offset width in a direction following the radial direction R, is set at half the value of a width in the radial direction R of the linear conductor in the conductor edge portion 22.

Meanwhile, the second layer side offset bend portion 24b is a bend portion for offsetting a part on the inter-layer joint portion 30 side of the second layer side offset bend portion 24b (in other words, the part formed with the second layer side joint surface 25b) to the radial direction outer side R2 of the part on the conductor edge portion 22 side of the second layer side offset bend portion 24b. In other words, the second layer side offset bend portion 24b is a bend portion for offsetting a center line position of the part on the inter-layer joint portion 30 side of the second layer side offset bend portion 24b to the radial direction outer side R2 relative to a center line position on the conductor edge portion 22 side of the second layer side offset bend portion 24b. In this example, the second layer side offset bend portion 24b is formed in a crank shape having a gentle bending angle when seen from either side of the circumferential direction C, and a second layer side offset width d2, which is the offset width in a direction following the radial direction R, is set at half the value of the width in the radial direction R of the linear conductor in the conductor edge portion 22. Hence, in this embodiment, the first layer side offset width d1 and the second layer side offset width d2 are set to be equal, and a sum of the first layer side offset width d1 and second layer side offset width d2 matches the width in the radial direction R of the linear conductor in the conductor edge portion 22.

As shown in FIG. 2A, with the constitution described above, a width in the radial direction R occupied by the inter-layer joint portion 30 can be made smaller than the total width in the radial direction R occupied by the first layer side joint extension portion 23a and the second layer side joint extension portion 23b on the conductor edge portion 22 side of the offset bend portion 24. More specifically, as noted above, the sum of the first layer side offset width d1 and second layer side offset width d2 matches the width in the radial direction R of the linear conductor in the conductor edge portion 22. Therefore, taking into account shape variation occurring during the joining operation, the width in the radial direction R occupied by the inter-layer joint portion 30 is approximately half the total width in the radial direction R occupied by the first layer side joint extension portion 23a and the second layer side joint extension portion 23b on the conductor edge portion 22 side of the offset bend portion 24.

Figure 4A:
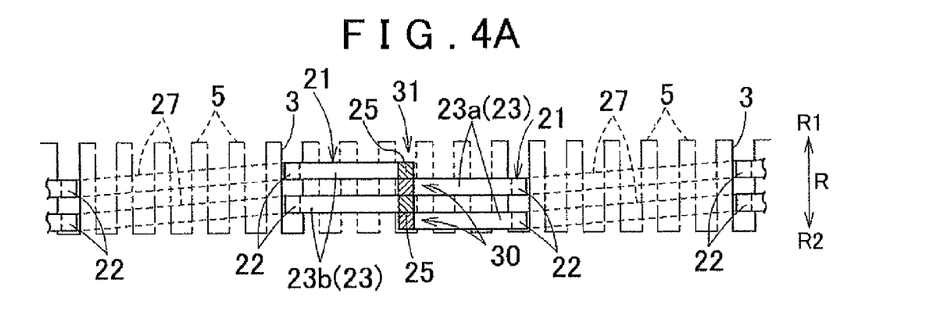
FIGS. 4A and 4B are pattern diagrams each showing a coil arrangement according to a comparative example.
Figure 4B:
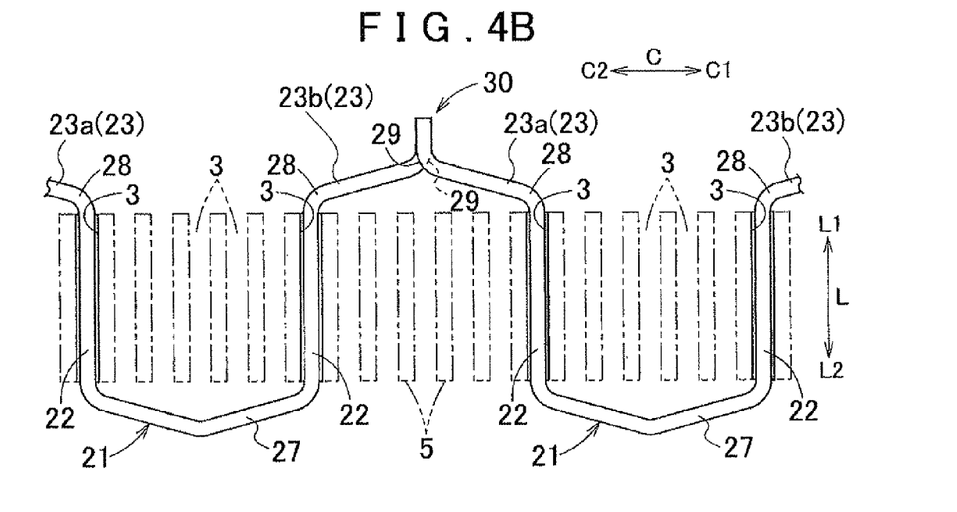

FIGS. 4A and 413 show a comparative example corresponding to FIGS. 2A and 2B, and illustrate an arrangement of the coil 20 when the offset bend portion 24 is not provided. Note that although FIGS. 4A and 4B are not related to an embodiment of the present invention, identical reference numerals to those of FIGS. 2A and 2B have been used in FIGS. 4A and 4B, and in the description relating to FIGS. 4A and 413 in this paragraph, identical reference numerals to those of the constitution pertaining to this embodiment are used. As is evident from FIGS. 4A and 4B, since neither the first layer side joint extension portion 23a nor the second layer side joint extension portion 23b forming the pair to be joined by the inter-layer joint portion 30 is provided with an offset bend portion, the first layer side joint extension portion 23a and the second layer side joint extension portion 23b are joined in the inter-layer joint portion 30 such that the respective joint surfaces 25 thereof oppose each other in the radial direction R. Hence, in this comparative example, the width in the radial direction R occupied by the inter-layer joint portion 30 is substantially equal to the total width in the radial direction R occupied by the first layer side joint extension portion 23a and the second layer side joint extension portion 23b. In other words, the width in the radial direction R of the inter-layer joint portion 30 according to this comparative example is approximately twice the width in the radial direction R of the inter-layer joint portion 30 according to this embodiment.

As shown in FIG. 1, the stator 1 according to this embodiment includes a plurality of radial direction arrangement portions 31 obtained by arranging a plurality of the inter-layer joint portions 30 in the radial direction. In this example, forty-eight radial direction arrangement portions 31, i.e. an identical number to the number of slots 3, are formed. More specifically, each one of the radial direction arrangement portions 31 is formed by arranging in the radial direction a plurality of inter-layer joint portions 30 sharing both the slot 3 in which the conductor edge portion 22 from which the first layer side joint extension portion 23a to be joined extends is disposed and the slot 3 in which the conductor edge portion 22 from which the second layer side joint extension portion 23b to be joined extends is disposed. In this embodiment, as noted above, the coil 20 has a ten-layer winding structure, and therefore each one of the radial direction arrangement portions 31 is constituted by five inter-layer joint portions 30 arranged in the radial direction. Note, however, that since FIG. 1 shows only the coils of four layers (the first layer to the fourth layer), only two of the five inter-layer joint portions 30 are illustrated in FIG. 1.

The plurality of inter-layer joint portions 30 (five in this example) forming each one of the radial direction arrangement portions 31 are constituted such that the respective first layer side joint extension portions 23a and second layer side joint extension portions 23b to be joined have an identical positional relationship in the radial direction R. Further, the plurality of inter-layer joint portions 30 (five in this example) forming each one of the radial direction arrangement portions 31 are constituted to have the identical form of the offset bend portions 24 provided on the joint extension portions 23 to be joined. Here, the "form of the offset bend portions 24" includes not only the shape (offset direction and offset width) of the offset bend portion 24, but also a grouping of the first layer side joint extension portion 23a and second layer side joint extension portion 23b pertaining to the joint extension portion 23 formed with the offset bend portion 24 (i.e. the first layer side joint extension portion 23a alone, the second layer side joint extension portion 23b alone, or both the first layer side joint extension portion 23a and the second layer side joint extension portion 23b). Accordingly, the term "to have the identical form of the offset bend portions 24 provided on the joint extension portions 23 to be joined" indicates whether or not the offset bend portion 24 is formed on the first layer side joint extension portion 23a to be joined and whether or not the offset bend portion 24 is formed on the second layer side joint extension portion 23b to be joined, and also indicates that when the offset bend portion 24 is formed on the first layer side joint extension portion 23a, the offset direction and offset width of the offset bend portion 24 match, and when the offset bend portion 24 is formed on the second layer side joint extension portion 23b, the offset direction and offset width of the offset bend portion 24 match. Hence, a distance between adjacent inter-layer joint portions 30 in the radial direction R can be secured appropriately with respect to all of the inter-layer joint portions 30 constituting the radial direction arrangement portion 31, and as a result, an electrical insulating property can be secured more reliably between the inter-layer joint portions 30. This point will be described below.

As shown in FIGS. 2A and 2B, in each of the plurality of inter-layer joint portions 30 constituting each one of the radial direction arrangement portions 31, the first layer side joint extension portion 23a to be joined (more accurately, the conductor edge portion 22 from which the first layer side joint extension portion 23a extends) is disposed on an odd-numbered layer while the second layer side joint extension portion 23b to be joined (more accurately, the conductor edge portion 22 from which the second layer side joint extension portion 23b extends) is disposed on an even-numbered layer. Further, the first layer side joint extension portion 23a (the conductor edge portion 22 from which the first layer side joint extension portion 23a extends) is offset to the radial direction outer side R2 by a single layer from the second layer side joint extension portion 23b (the conductor edge portion 22 from which the second layer side joint extension portion 23b extends) and therefore disposed on the adjacent layer on the radial direction outer side R2. Although not shown in the drawing, the remaining three inter-layer joint portions 30 not shown in the drawing are formed similarly. Hence, in the plurality of inter-layer joint portions 30 (five in this example) constituting each one of the radial direction arrangement portions 31, the first layer side joint extension portions 23a (the conductor edge portions 22 from which the first layer side joint extension portions 23a extends) and the second layer side joint extension portions 23b (the conductor edge portions 22 from which the second layer side joint extension portions 23b extend) to be joined have an identical positional relationship in the radial direction R.

Further, as shown in FIGS. 2A and 2B, in each of the plurality of inter-layer joint portions 30 constituting each one of the radial direction arrangement portions 31, the first layer side joint extension portion 23a to be joined is offset to the radial direction inner side R1 and the second layer side joint extension portion 23b to be joined is offset to the radial direction outer side R2. Moreover, the respective offset widths thereof (the first layer side offset width d1 and the second layer side offset width d2) are equal. Although not shown in the drawing, the remaining three inter-layer joint portions 30 not shown in the drawing are formed similarly. Hence, in the plurality of inter-layer joint portions 30 (five in this example) constituting each one of the radial direction arrangement portions 31, the offset bend portions 24 provided on the joint extension portions 23 to be joined have an identical form.

As described above, in this embodiment, the sum of the first layer side offset width d1 and second layer side offset width d2 matches the width in the radial direction R of the linear conductor in the conductor edge portion 22, and therefore the width in the radial direction R occupied by the inter-layer joint portion 30 is approximately half the total width in the radial direction R occupied by the first layer side joint extension portion 23a and the second layer side joint extension portion 23b on the conductor edge portion 22 side of the offset bend portion 24. Accordingly, as shown in FIG. 2A, a separation distance t in the radial direction R between the inter-layer joint portions 30 constituting each one of the radial direction arrangement portions 31 takes an approximately equal value to the width in the radial direction R of the linear conductor in the conductor edge portion 22. Furthermore, as described above, in the plurality of inter-layer joint portions 30 constituting each one of the radial direction arrangement portions 31, the first layer side joint extension portions 23a and second layer side joint extension portions 23b to be joined have an identical positional relationship in the radial direction R, and the offset bend portions 24 provided on the joint extension portions 23 to be joined have an identical form. Therefore, although not shown in the drawing, the separation distance t in the radial direction between inter-layer joint portions 30 that are adjacent in the radial direction R can be set at an approximately equal value to the width in the radial direction R of the linear conductor in the conductor edge portion 22 with respect to all of the inter-layer joint portions 30. In the comparative example shown in FIGS. 4A and 4B, on the other hand, adjacent inter-layer joint portions 30 in the radial direction R are disposed close to each other in the radial direction R, and it is therefore difficult to secure an appropriate distance between the adjacent inter-layer joint portions 30 in the radial direction R. Hence, according to the present invention, an electrical insulating property can be secured reliably between the inter-layer joint portions 30, enabling an improvement in the overall electrical insulating property of the coil 20.

Further, to simplify the process for joining together the joint extension portions 23 and improve the reliability of the joint, the respective tip end portions of the first layer side joint extension portion 23a and the second layer side joint extension portion 23b forming the pair to be joined by the inter-layer joint portion 30 are preferably disposed in the positions identical in the axial direction L. With regard to this point, the offset bend portion 24 is formed on both of the pair of joint extension portions 23 provided on the segment conductor 21 according to this embodiment, and therefore the tip end portions of the first layer side joint extension portion 23a and the second layer side joint extension portion 23b forming the pair to be joined by the inter-layer joint portion 30 can be positioned in the positions identical or substantially identical in the axial direction L even when the pair of joint extension portions 23 are identical in length. As a result, strictness in management of the orientation and type of the segment conductors 21 required for manufacture of the stator 1 can be reduced, enabling a reduction in manufacturing cost.

Furthermore, to secure reliability in the electrical insulating property between adjacent inter-layer joint portions 30, an insulating member may be disposed between adjacent inter-layer joint portions 30, or the surface of the inter-layer joint portion 30 may be covered by an insulating material (resin or the like). With regard to this point, according to the present invention, an appropriate distance can be secured between adjacent inter-layer joint portions 30, and therefore measures such as increasing a thickness of the insulating member or forming the insulating material to cover the inter-layer joint portion 30 in a manner which reduces defects (voids, pinholes, and so on) can be implemented favorably. In a case where a voltage applied to the coil 20 of the stator 1 is comparatively small, sufficient insulation is secured simply by securing distance between the inter-layer joint portions 30, and therefore an insulating member or an insulating material can be omitted.

3. Other Embodiments

Finally, other embodiments of the present invention will be described. Note that features described in relation to each of the following embodiments are not limited to use in the corresponding embodiment alone, and may be applied to other embodiments as long as contradictions do not occur as a result.

Figure 5A:
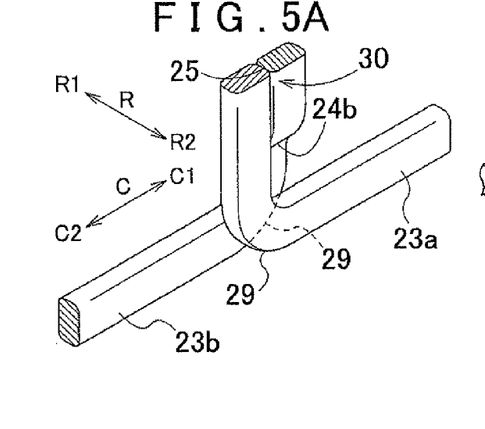
FIGS. 5A and 5B are enlarged pattern diagrams each showing the vicinity of an inter-layer joint portion of a coil according to another embodiment of the present invention.
Figure 5B:
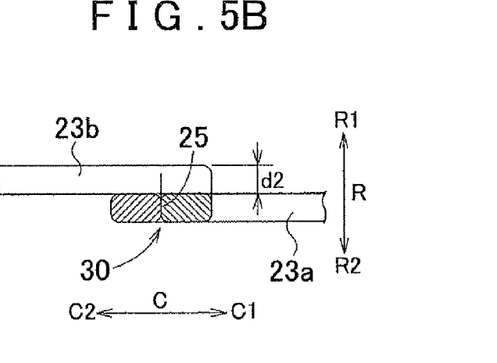

(1) In the above embodiment, a case in which the first layer side offset width d1 and the second layer side offset width d2 are both half the value of the width in the radial direction R of the linear conductor in the conductor edge portion 22 was described. However, the embodiments of the present invention are not limited thereto, and the first layer side offset width d1 and the second layer side offset width d2 may be modified independently as appropriate. At this time, the sum of the first layer side offset width d1 and the second layer side offset width d2 preferably matches the width in the radial direction R of the linear conductor in the conductor edge portion 22. Note that one of the first layer side offset width d1 and the second layer side offset width d2 may be set at zero. More specifically, a constitution may be provided in which one of the first layer side joint extension portion 23a and the second layer side joint extension portion 23b forming the pair to be joined by the inter-layer joint portion 30 includes the offset bend portion 24 for offsetting the corresponding joint extension portion 23 in the radial direction R toward the side approaching the other joint extension portion 23 of the pair. FIGS. 5A and 5B show a case in which the first layer side offset width d1 is set at zero and the second layer side offset width d2 is set at an identical value to the width in the radial direction R of the linear conductor in the conductor edge portion 22, or in other words a constitution in which only the second layer side joint extension portion 23b includes the offset bend portion 24 (the second layer side offset bend portion 24b).

Figure 6A:
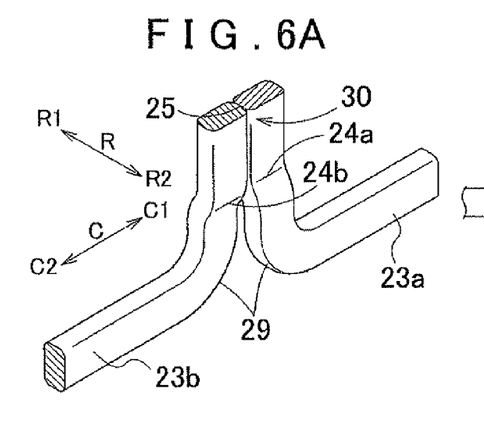
FIGS. 6A and 6B are enlarged pattern diagrams each showing the vicinity of an inter-layer joint portion of a coil according to another embodiment of the present invention.
Figure 6B:
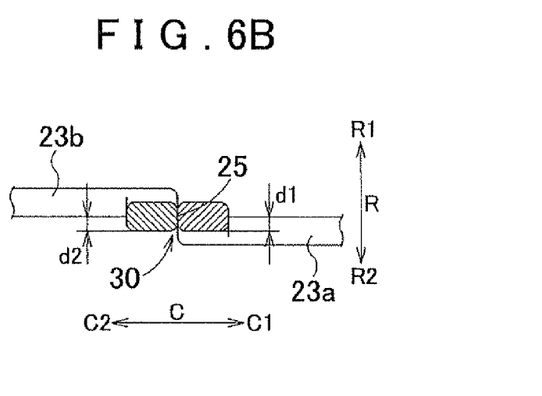
Figure 7A:
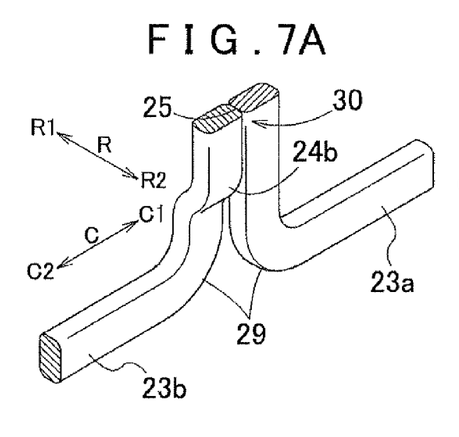
FIGS. 7A and 7B are enlarged pattern diagrams each showing the vicinity of an inter-layer joint portion of a coil according to another embodiment of the present invention.
Figure 7B:
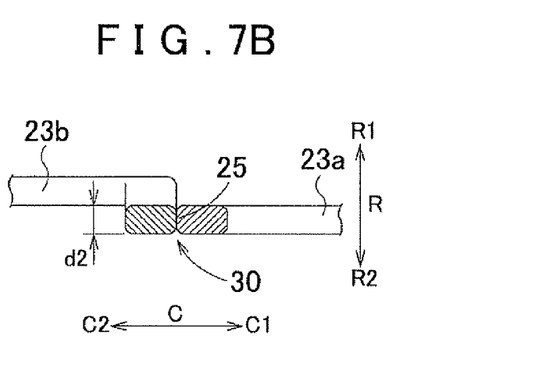

(2) In the above embodiment, the first layer side joint extension portion 23a and second layer side joint extension portion 23b forming the pair to be joined by the inter-layer joint portion 30 are disposed so as to intersect when seen from the radial direction R first side. Further, the joint surface 25 of the first layer side joint extension portion 23a faces the circumferential direction first side C1 and the joint surface 25 of the second layer side joint extension portion 23b faces the circumferential direction second side C2. However, the embodiments of the present invention are not limited thereto, and in another embodiment of the present invention, as shown in FIGS. 6A and 6B, the first layer side joint extension portion 23a and the second layer side joint extension portion 23b forming the pair to be joined by the inter-layer joint portion 30 do not intersect when seen from the radial direction R first side, whereby the joint surface 25 of the first layer side joint extension portion 23a faces the circumferential direction second side C2 and the joint surface 25 of the second layer side joint extension portion 23b faces the circumferential direction first side C1. Note that in the example shown in FIGS. 6A and 6B, similarly to the above embodiment, the first layer side offset width d1 and the second layer side offset width d2 are both half the value of the width in the radial direction R of the linear conductor in the conductor edge portion 22. However, likewise in this constitution, the first layer side offset width d1 and the second layer side offset width d2 may be modified independently as appropriate. At this time, the sum of the first layer side offset width d1 and the second layer side offset width d2 preferably matches the width in the radial direction R of the linear conductor in the conductor edge portion 22. FIGS. 7A and 7B show a case in which the first layer side offset width d1 is set at zero and the second layer side offset width d2 is set at an identical value to the width in the radial direction R of the linear conductor in the conductor edge portion 22, or in other words a constitution in which only the second layer side joint extension portion 23b includes the offset bend portion 24 (the second layer side offset bend portion 24b), in relation to FIGS. 6A and 6B.

(3) In the above embodiment, the pair of joint extension portions 23 (the first layer side joint extension portion 23a and the second layer side joint extension portion 23b) joined by the inter-layer joint portion 30 both include the first bend portion 28 and the second bend portion 29 and both have parts extending in the circumferential direction C. However, the embodiments of the present invention are not limited thereto. It is one of preferred embodiments of the present invention that one of the pair of joint extension portions 23 (the first layer side joint extension portion 23a and the second layer side joint extension portion 23b) joined by the inter-layer joint portion 30 includes neither the first bend portion 28 nor the second bend portion 29 and is formed in a straight line shape extending in the axial direction L when seen from either radial direction R side.

(4) In the above embodiment, a case in which the offset bend portion 24 is formed on the joint surface 25 side of the second bend portion 29 was described. However, the embodiments of the present invention are not limited thereto, and the formation position of the offset bend portion 24 may be modified appropriately. For example, the offset bend portion 24 and the second bend portion 29 may be formed in identical positions.

(5) In the above embodiment, a case in which the coil 20 is wound around the stator core 2 by wave winding was described, but the coil 20 may be wound around the stator core 2 by lap winding or concentric winding. Alternatively, the coil 20 may include a wave winding portion wound by wave winding and a non-wave winding portion wound by lap winding or concentric winding. Furthermore, in the above embodiment, a case in which the coil 20 is wound around the stator core 2 by distributed winding was described, but the coil 20 may be wound around the stator core 2 by concentrated winding.

(6) In the above embodiment, the pair of conductor edge portions 22 provided in the conductor segment 21 are disposed on adjacent layers in slots 3 having different positions in the circumferential direction C. However, the embodiments of the present invention are not limited thereto, and the coil 20 may include segment conductors 21 in which the pair of conductor edge portions 22 are disposed on the same layer in slots 3 having different positions in the circumferential direction C and segment conductors 21 in which the pair of conductor edge portions 22 are disposed on layers away from each other by two or more layers in slots 3 having different positions in the circumferential direction C. With this constitution also, by setting the pair of joint extension portions 23 connected in the inter-layer joint portion 30 as the joint extension portions 23 extending respectively from the conductor edge portions 22 that are disposed on adjacent layers in slots 3 having different positions in the circumferential direction C, the first layer side joint extension portion 23a and the second layer side joint extension portion 23b can be joined such that the respective joint portions 25 thereof oppose each other in the circumferential direction C, similarly to the above embodiment.

(7) In the above embodiment, in the plurality of inter-layer joint portions 30 constituting each one of the radial direction arrangement portions 31, the first layer side joint extension portions 23a and the second layer side joint extension portions 23b to be joined have an identical positional relationship in the radial direction R, and the offset bend portions 24 provided on the joint extension portions 23 to be joined have an identical form. However, the embodiments of the present invention are not limited thereto, and in at least a part of the plurality of inter-layer joint portions 30 constituting each one of the radial direction arrangement portions 31, the positional relationship in the radial direction R between the first layer side joint extension portion 23a and the second layer side joint extension portion 23b to be joined may differ from the positional relationship in the radial direction R between the first layer side joint extension portion 23a and the second layer side joint extension portion 23b to be joined in another inter-layer joint portion 30 constituting the same radial direction arrangement portion 31. Further, in at least a part of the plurality of inter-layer joint portions 30 constituting each one of the radial direction arrangement portions 31, the form of the offset bend portions 24 provided on the joint extension portions 23 to be joined may differ from the form of the offset bend portions 24 provided on the joint extension portions 23 to be joined in another inter-layer joint portion 30 constituting the same radial direction arrangement portion 31. In all cases, the positional relationship in the radial direction R between the first layer side joint extension portion 23a and the second layer side joint extension portion 23b to be joined and the form of the offset bend portions 24 provided on the joint extension portions 23 to be joined are preferably designed such that the plurality of inter-layer joint portions 30 are disposed evenly or substantially evenly in the radial direction R within a radial direction range occupied by each one of the radial direction arrangement portions 31. Furthermore, with regard to the inter-layer joint portions 30 positioned on a radial direction innermost side and a radial direction outermost side of the radial direction arrangement portion 31, the offset direction may be set on a side heading away from the adjacent inter-layer joint portion 30 in the radial direction, regardless of the form of the other inter-layer joint portions 30 constituting the same radial direction arrangement portion 31.

(8) In the above embodiment, the radial direction arrangement portion 31 is formed by arranging in the radial direction a plurality of inter-layer joint portions 30 sharing both the slot 3 in which the conductor edge portion 22 from which the first layer side joint extension portion 23a to be joined extends is disposed and the slot 3 in which the conductor edge portion 22 from which the second layer side joint extension portion 23b to be joined extends is disposed. However, the embodiments of the present invention are not limited thereto, and in at least a part of the plurality of inter-layer joint portions 30 constituting each one of the radial direction arrangement portions 31, at least one of the slot 3 provided with the conductor edge portion 22 from which the first layer side joint extension portion 23a to be joined extends and the slot 3 provided with the conductor edge portion 22 from which the second layer side joint extension portion 23b to be joined extends is not shared with a corresponding slot 3 in another inter-layer joint portion 30 constituting the same radial direction arrangement portion 31.

(9) In the above embodiment, the segment conductor 21 includes the pair of conductor edge portions 22, the inherent transition portion 27 that connects one ends of the pair of conductor edge portions 22 to each other, and the pair of joint extension portions 23 extending respectively from the other ends of the pair of conductor edge portions 22. However, the embodiments of the present invention are not limited thereto, and it is one of the preferred embodiment of the present invention, at least a part of the segment conductors 21 constituting the coil 20 are segment conductors having conductor edge portions 22 disposed in the axial direction L within the slots 3 and a pair of joint extension portions 23 extending in the axial direction L relative to the stator core 2 from both end portions of the conductor edge portions 23. In other words, at least a part of the segment conductors 21 constituting the coil 20 may be formed without the inherent transition portion 27 (as I-shaped segment conductors, L-shaped segment conductors in which one of the joint extension portions 23 is bent in advance, and so on, for example).

(10) In the above embodiment, the linear conductor constituting the segment conductor 21 has a rectangular sectional shape on an orthogonal plane to the extension direction. However, the embodiments of the present invention are not limited thereto, and linear conductors having a circular, elliptical, square, polygonal, or other sectional shape may be used instead.

(11) In the above embodiment, the armature for a rotating electrical machine according to the present invention is applied to a stator for an inner rotor type rotating electrical machine but may be applied to a stator for an outer rotor type rotating electrical machine. The armature for a rotating electrical machine according to the present invention may also be applied to a rotor for a fixed magnetic field type rotating electrical machine.

The present invention may be used favorably in an armature for a rotating electrical machine, including an armature core formed by disposing in a distributed fashion a plurality of slots extending in an axial direction of a cylindrical core reference surface in a circumferential direction of the core reference surface, and a coil formed by joining a plurality of segment conductors and wound around the armature core.

What is claimed is:

1. An armature for a rotating electrical machine, including an armature core formed by disposing in a distributed fashion a plurality of slots extending in an axial direction of a cylindrical core reference surface in a circumferential direction of the core reference surface and a coil formed by joining a plurality of segment conductors and wound around the armature core, wherein
   the segment conductor includes a conductor edge portion disposed along the axial direction within the slot, and a joint extension portion that extends in the axial direction relative to the armature core from at least one end portion of the conductor edge portion,
   the coil has an n-layer winding structure in which n (where n is an integer of two or more) of the conductor edge portions are arranged in a radial direction within each slot, and includes an inter-layer joint portion on an axial direction outer side of the armature core, the inter-layer joint portion being formed by joining together a first layer side joint extension portion and a second layer side joint extension portion, which are joint extension portions extending from conductor edge portions that are disposed respectively in different slots so as to form adjacent layers to each other, and
   at least one of the first layer side joint extension portion and the second layer side joint extension portion forming a pair to be joined by the inter-layer joint portion includes an offset bend portion for offsetting the corresponding joint extension portion in the radial direction toward a side approaching the other joint extension portion of the pair, and the first layer side joint extension portion and the second layer side joint extension portion are joined such that respective joint surfaces thereof oppose each other in a circumferential direction.

2. The armature for a rotating electrical machine according to claim 1, wherein the conductor edge portion from which the first layer side joint extension portion extends is positioned on a circumferential direction first side relative to the conductor edge portion from which the second layer side joint extension portion extends,
   the joint surface of the second layer side joint extension portion faces the circumferential direction first side, and
   the joint surface of the first layer side joint extension portion faces a circumferential direction second side.

3. The armature for a rotating electrical machine according to claim 2, further comprising:
   a plurality of radial direction arrangement portions formed by arranging in the radial direction a plurality of the inter-layer joint portions sharing both the slot in which the conductor edge portion from which the first layer side joint extension portion to be joined extends is disposed and the slot in which the conductor edge portion from which the second layer side joint extension portion to be joined extends is disposed, wherein
   in each of the plurality of inter-layer joint portions constituting each one of the radial direction arrangement portions, the first layer side joint extension portion and the second layer side joint extension portion to be joined have an identical positional relationship in the radial direction, and the offset bend portions provided on the joint extension portions to be joined have an identical form.

4. The armature for a rotating electrical machine according to claim 1, wherein the first layer side joint extension portion and the second layer side joint extension portion forming the pair to be joined by the inter-layer joint portion are disposed so as to intersect when seen from a radial direction first side, the conductor edge portion from which the first layer side joint extension portion extends is positioned on a circumferential direction first side relative to the conductor edge portion from which the second layer side joint extension portion extends, the joint surface of the first layer side joint extension portion faces the circumferential direction first side, and the joint surface of the second layer side joint extension portion faces a circumferential direction second side.

5. The armature for a rotating electrical machine according to claim 4, further comprising:

a plurality of radial direction arrangement portions formed by arranging in the radial direction a plurality of the inter-layer joint portions sharing both the slot in which the conductor edge portion from which the first layer side joint extension portion to be joined extends is disposed and the slot in which the conductor edge portion from which the second layer side joint extension portion to be joined extends is disposed, wherein in each of the plurality of inter-layer joint portions constituting each one of the radial direction arrangement portions, the first layer side joint extension portion and the second layer side joint extension portion to be joined have an identical positional relationship in the radial direction, and the offset bend portions provided on the joint extension portions to be joined have an identical form.

6. The armature for a rotating electrical machine according to claim 1, further comprising:

a plurality of radial direction arrangement portions formed by arranging in the radial direction a plurality of the inter-layer joint portions sharing both the slot in which the conductor edge portion from which the first layer side joint extension portion to be joined extends is disposed and the slot in which the conductor edge portion from which the second layer side joint extension portion to be joined extends is disposed, wherein in each of the plurality of inter-layer joint portions constituting each one of the radial direction arrangement portions, the first layer side joint extension portion and the second layer side joint extension portion to be joined have an identical positional relationship in the radial direction, and the offset bend portions provided on the joint extension portions to be joined have an identical form.

* * * * *